United States Patent [19]

Storm et al.

[11] 4,252,281

[45] Feb. 24, 1981

[54] CROP REINJECTION CHAMBER

[75] Inventors: Donald P. Storm, Hinsdale; Max I. Zielinski, Downers Grove, both of Ill.

[73] Assignee: International Harvester Company, Chicago, Ill.

[21] Appl. No.: 64,654

[22] Filed: Aug. 8, 1979

[51] Int. Cl.³ .............................................. B02C 18/22
[52] U.S. Cl. ................................................... 241/222
[58] Field of Search ..................... 241/101.7, 221, 222, 241/223

[56] References Cited

U.S. PATENT DOCUMENTS

| | | | |
|---|---|---|---|
| 3,348,594 | 10/1967 | Hoch | 241/222 UX |
| 3,805,660 | 4/1974 | Burrough | 241/222 UX |
| 3,904,134 | 9/1975 | Olson | 241/221 X |
| 3,916,605 | 11/1975 | Richards | 241/222 X |

Primary Examiner—Howard N. Goldberg
Attorney, Agent, or Firm—Dennis K. Sullivan; Neal C. Johnson; F. David AuBuchon

[57] ABSTRACT

A forage harvester having a rotary reel cutterhead disposed within a housing to operate against a shear bar, peripheral shielding being disposed on the inlet side of the cutterhead except for a material entry gap in the region above the shear bar is provided with a crop reinjection chamber disposed in the peripheral shielding immediately above the material entry gap, the chamber comprising a transversely extending cavity wherein the cavity wall in the direction of rotation includes an arcuate portion for redirecting the flow of crops escaping the cutterhead periphery back into the cutterhead at a substantial angle to the cutterhead periphery.

2 Claims, 2 Drawing Figures

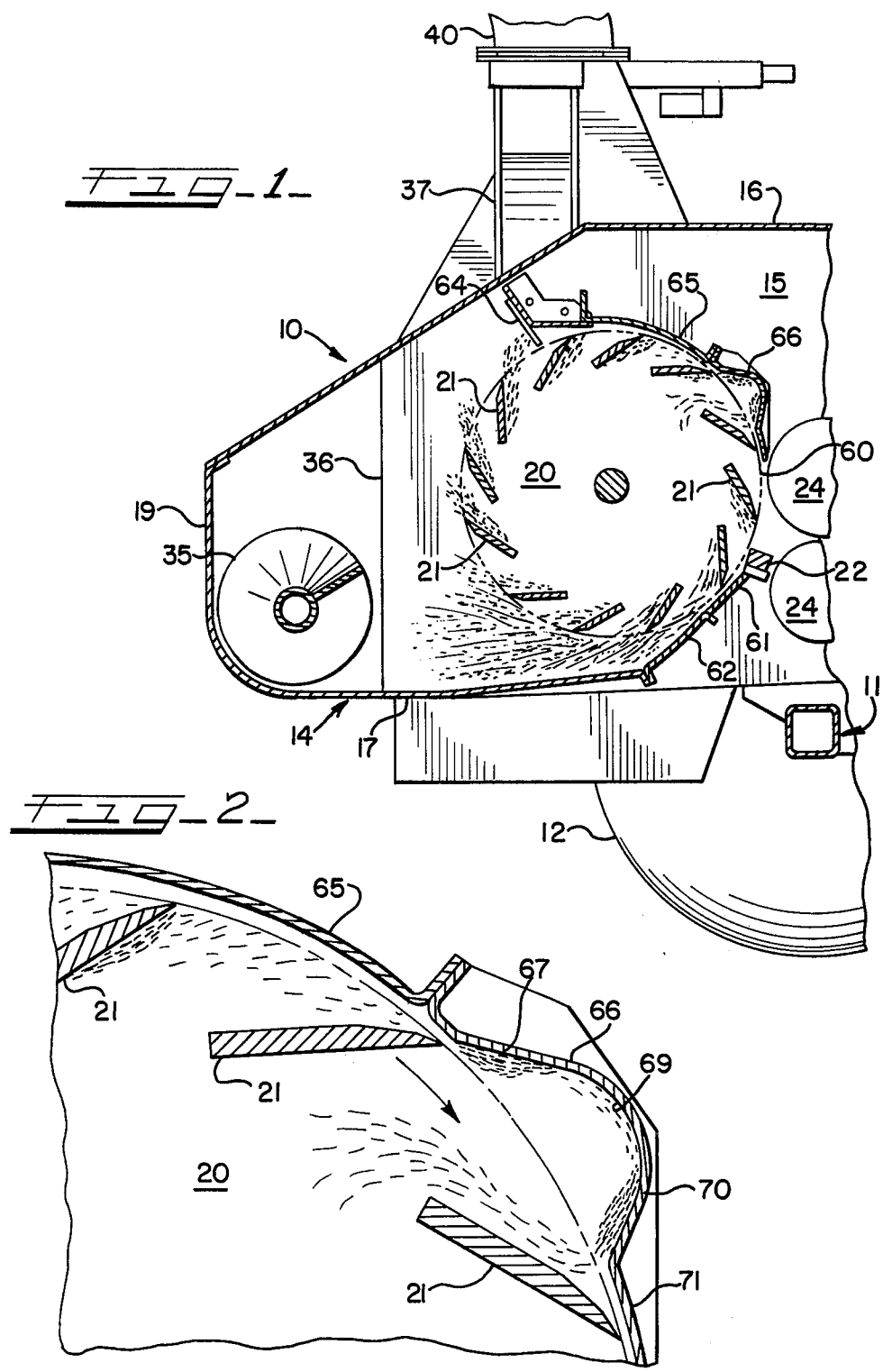

CROP REINJECTION CHAMBER

BACKGROUND OF THE INVENTION

This invention relates to forage harvesters of the type having a rotary reel cutterhead for chopping crops previously harvested and/or gathered by an associated unit and, more particularly, to an improvement in the peripheral shielding of the cutterhead to substantially reduce the adverse effects of cut crop carryover.

Carryover is defined as crop which after being sheared from the plant by the action of the cutterhead knives against the shear bar, does not exit through the rearward crop discharge, or recutter screen, if used, but rather remains within the periphery of the cutterhead on the inside leading edges of the knives. In prior machines wherein the periphery of the cutterhead is concentrically shielded on its forward side, the cut crop remains on the knives until it is carried back to the crop entrance area above the shear bar whereat it spills out by centrifugal action and by air flow over the incoming crop plants and the infeed rolls, thus either recycling with the incoming plants or escaping forwardly out of the feed rolls, producing a loss of crop as well as an unsightly appearance of the harvester.

SUMMARY OF THE INVENTION

We have discovered that the carryover problem can be solved by allowing the carried over crops to escape the cutterhead for redirection back into the interior of the cutterhead before they are carried all the way back to the material entry.

Accordingly, it is the primary object of the invention claimed herein to provide a forage harvester of the type having a rotary reel cutterhead with a crop reinjection chamber in the nature of a cavity in the peripheral shielding above the material entry permitting the cut crop to escape from the cutterhead while retaining the crop for reinjection back into the cutterhead after the knife passes the chamber.

The above objects are specifically met in a forage harvester having a rotary reel cutterhead disposed within a housing to operate against a shear bar, peripheral shielding being disposed on the inlet side of the cutterhead except for a material entry gap in the region above the shear bar. A crop reinjection chamber is disposed in the peripheral shielding immediately above the material entey gap, the chamber comprising a transversely extending cavity wherein the cavity wall in the direction of rotation includes an arcuate portion for redirecting the flow of crops escaping the cutterhead periphery back into the cutterhead at a substantial angle to the cutterhead periphery.

BRIEF DESCRIPTION OF THE DRAWINGS

Other objects and advantages of the invention will become more apparent upon reference to the detailed description thereof and to the drawings, in which:

FIG. 1 is a longitudinal section of the rear portion of a forage harvester illustrating the cutterhead assembly and shielding thereof together with the crop reinjection chamber; and FIG. 2 is an enlarged view of the interface between the reinjection chamber and the cutterhead periphery.

DETAILED DESCRIPTION OF THE PREFERRED EMBODIMENT

Turning to the drawings, there is shown in FIG. 1 the rear portion of a forage harvester generally designated 10 of the general type illustrated, for example, in U.S. Pat. No. 3,730,441, including a frame assembly 11 supported by ground wheels 12. A cutterhead housing generally designated 14 is mounted on the frame and includes fore-and-aft extending transversely spaced side sheets 15, a top sheet 16 and a discharge pan or floor sheet 17, the latter terminating in an upturned rear wall 19 forming the rear portion of an auger trough. Rotatably mounted in the cutterhead housing 14 is a rotary reel type cutterhead shown schematically at 20 which is provided adjacent its periphery with a plurality of cutter knives 21, which, when the cutterhead 20 is rotated, form a cylindrical cutting periphery. Disposed adjacent the periphery of the cutterhead 20 on the forward inlet side thereof is a stationary shear bar 22 which cooperates with the cutterhead knives 21 to chop crops fed to the cutterhead between the infeed rolls 24 disposed in the inlet of the housing 14 forward of the shear bar 22. Disposed rearwardly of the cutterhead 20 in the discharge outlet of the housing 14 is a transverse auger 35 for moving material transversely in the trough formed by the rear wall 19 and a forward wall 36 to the opposite side of the forage harvester from the cutterhead housing whereat the crops are infed into a copy blower 37 which delivers material out through the discharge 40 to a trailing forage wagon (not shown).

It will be seen that the entire forward periphery of the cutterhead 20 is completely shielded except for the relatively narrow material entry gap as at 60 (the rolls 24 separate to allow a thicker mat of crops to enter the cutterhead). This shielding is provided by the shields 61 and 62 below the shear bar 22, the shield 62 abutting the floor 17 of the housing although an air inlet gap would be present between 62 and 17 if a recutter screen were used. The forward upper side of the cutterhead periphery is provided with a radially extending strike off plate 64 which prevents carry over from the discharge area externally of the cutterhead periphery. A peripheral generally concentric shield 65 extends from the strike off plate toward the material entry gap 60. However, in the region immediately above the material entry gap 60, the peripheral shielding is provided with the crop reinjection chamber 66 which essentially is a transversely extending cavity in the peripheral shielding having a relatively smooth wall. As best seen in FIG. 2, the wall of the chamber 66 comprises three sections disposed serially in the direction of cutterhead rotation, the first being a relatively straight wall section 67 which is disposed to be somewhat parallel to the flow of crops centrifugally off the blade 21 into the cavity. The second section is the arcuate portion 69 which smoothly blends with the portion 67 and redirects the flow of material from the outward flow off the blade 21 to an inward flow back toward the periphery of the cutterhead. The third portion of the reinjection chamber 66 comprises a straight wall 70 blending tangentially with the arcuate portions 69, the straight wall 70 being oriented at a substantial angle to the tangent of the cutterhead periphery so that crops exiting the reinjection chamber 66 will be directed toward the interior of the cutterhead. Beneath the reinjection chamber, the peripheral shield continues in a short concentric portion 71 to prevent material from escaping from the cavity into the entry gap 60. It will be understood, however, that the trailing concentric portion 71 should be relatively small because the reinjection chamber 66 should be located in close proximity to the material entry gap 60. This location maximizes the reinjection chambers effect because a maximum time and distance is allowed to collect crop material on the cutterhead periphery before discharging it to the chamber 66 and it also minimizes the time that additional crop material can build up before the cutting blade 21 reaches the material entry gap 60.

The chamber wall 67, 69, 70 in the direction of rotation is shaped to provide a longer path of travel of the crops than that taken by the cutterhead knives across the cavity, preferably by at least the peripheral thickness of a knife. Thus, as the crops leave the cutterhead knives 21 at the wall 67, they will follow the interior surface of the chamber 66 and lose speed due to the changing curvature and resultant friction as well as travel slightly further to be reinjected into the cutterhead perimeter at the end of the reinjection chamber. It will be appreciated that the crops leave the cutterhead under the influence of centrifugal force and also the air flow generated by the knives. However, the slowing of the crop and the longer path of travel insures that the carryover crop will enter the periphery of the cutterhead after the knife edge is past. Thus, the crop would be directed into the interior of the cutterhead away from the entry gap with a minimum of spillage occuring over the feed rolls and incoming crops. In this manner, the carryover is mostly confined within the cutterhead and the entry area thus minimizing the undesirable crop loss over the rolls and unsightly appearance.

It has been found that the crop reinjection chamber works best when the forage harvester is used for chopping whole corn silage crops and ear corn silage crops, the latter in conjunction with a recutter screen. The corn kernels provide a cleaning action in the cavity which prevents the cavity from becoming plugged.

Thus, it has been seen that there has been provided, in accordance with the invention, a crop reinjection chamber which fully satisfies the objects and advantages set forth above. In the light of the foregoing description, it is evident that others of skill in the art will recognize modifications which would not depart from scope of the inventive concept. For example, although the chamber described is illustrated as having two straight sections joined by an arcuate section, it is evident that the chamber could be totally arcuate, for example, parabolic, without departing from the invention. Accordingly, it is intended to embrace all such modifications as fall within the scope of the claims.

What is claimed is:

1. In a forage harvester having a mobile main frame, a cutterhead housing mounted on the frame and having a crop inlet and a discharge outlet for cut crop, a rotary reel type cutterhead mounted within the housing and having a plurality of cutting knives disposed thereon, the edges of said knives generating a cylindrical periphery upon rotation of the cutterhead, a stationary shear bar on the crop inlet side of said cutterhead, peripheral shielding disposed in generally concentric relation to said cutterhead on the crop inlet side thereof, said shielding having a material entry gap in the region above said shear bar permitting the entry of uncut crops into said cutterhead, the improvement wherein said peripheral shielding is provided with a cut crop reinjection chamber in the region above said material entry gap, said chamber having a non-concentric peripheral wall of such configuration that, in serial order, cut crop carried on the leading surfaces of said knives is permitted to centrifugally escape outwardly of the cutterhead and flow along the contour of said peripheral wall of said chamber, the direction of flow of said cut crop is reversed by an arcuate portion of the peripheral wall back toward said cutterhead, and the flow of said cut crop is redirected back into said cutterhead at a substantial angle to the tangent of said cutterhead periphery at the point of material reentry after the respective knives have passed said chamber.

2. The invention in accordance with claim 1 and said peripheral shielding further including a short portion concentric to said cutterhead between said chamber and said material entry gap, the peripheral wall of said chamber being disposed at a distinct angle thereto.

* * * * *